US011368878B2

(12) United States Patent
Hashemi et al.

(10) Patent No.: US 11,368,878 B2
(45) Date of Patent: Jun. 21, 2022

(54) METHOD AND APPARATUS FOR TRAFFIC MANAGEMENT IN A SELF-BACKHAULED NETWORK BY USING CAPACITY REQUESTS

(71) Applicant: Telefonaktiebolaget LM Ericsson (publ), Stockholm (SE)

(72) Inventors: Mona Hashemi, Ottowa (CA); Mikael Coldrey, Borås (SE); Henrik Sahlin, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/645,017

(22) PCT Filed: Sep. 20, 2017

(86) PCT No.: PCT/EP2017/073835
§ 371 (c)(1),
(2) Date: Mar. 6, 2020

(87) PCT Pub. No.: WO2019/057279
PCT Pub. Date: Mar. 28, 2019

(65) Prior Publication Data
US 2020/0260326 A1    Aug. 13, 2020

(51) Int. Cl.
*H04W 28/08* (2009.01)
*H04W 28/20* (2009.01)
(Continued)

(52) U.S. Cl.
CPC ....... *H04W 28/0983* (2020.05); *H04W 28/20* (2013.01); *H04W 28/22* (2013.01); *H04W 88/14* (2013.01)

(58) Field of Classification Search
CPC . H04W 28/0983; H04W 28/20; H04W 28/22; H04W 40/02; H04W 72/0426;
(Continued)

(56) References Cited

U.S. PATENT DOCUMENTS 6,330,460 B1 * 12/2001 Wong .................... H01Q 1/246
455/517
9,198,017 B2 * 11/2015 Horn ..................... H04W 8/005
(Continued)

FOREIGN PATENT DOCUMENTS

WO    2012105881 A1    8/2012
WO    2014092545 A1    6/2014

OTHER PUBLICATIONS

AT&T et al., "New SID Proposal: Study on Integrated Access and Backhaul for NR", 3GPP TSG RAN Meeting #75, Dubrovnik, Croatia, Mar. 6, 2017, pp. 1-5, RP-170688, 3GPP.
(Continued)

*Primary Examiner* — Stephen J Clawson
(74) *Attorney, Agent, or Firm* — Coats + Bennett, PLLC (57) ABSTRACT

The present invention describes a radio base station and a method for integrated access and backhaul by using backhaul capacity requests. The radio base station is configured to allocate a first part of its capacity to access traffic and a second part of its capacity to backhaul traffic. It is further configured to form a self-backhauled network with a plurality of other radio base stations and select a backhaul route through the self-backhauled network for uplink and downlink backhaul traffic.

15 Claims, 9 Drawing Sheets

(51) Int. Cl.
*H04W 28/22* (2009.01)
*H04W 88/14* (2009.01)

(58) Field of Classification Search
CPC .......... H04W 72/0486; H04W 72/085; H04W 84/047; H04W 88/14
See application file for complete search history.

(56) References Cited

U.S. PATENT DOCUMENTS

| | | | | |
|---|---|---|---|---|
| 2002/0159409 A1* | 10/2002 | Wolfe | .................... | H04W 92/20 370/329 |
| 2008/0080414 A1* | 4/2008 | Thubert | ................ | H04W 76/12 370/328 |
| 2008/0267404 A1* | 10/2008 | Budde | ................ | H04L 63/0853 380/270 |
| 2009/0029645 A1* | 1/2009 | Leroudier | ........... | H04W 84/047 455/7 |
| 2009/0036138 A1* | 2/2009 | Horn | .................... | H04L 47/824 455/450 |
| 2009/0109916 A1 | 4/2009 | Berg et al. | | |
| 2010/0322144 A1* | 12/2010 | Lee | ........................ | H04B 7/155 370/315 |
| 2012/0163316 A1 | 6/2012 | Kim et al. | | |
| 2013/0003646 A1* | 1/2013 | Michel | .............. | H04W 72/1289 370/315 |
| 2013/0310052 A1* | 11/2013 | Timus | ............... | H04W 72/0433 455/445 |
| 2014/0335877 A1* | 11/2014 | Roberts | ................. | H04W 28/16 455/452.1 |
| 2015/0071248 A1* | 3/2015 | Faerber | ............. | H04W 36/0055 370/331 |
| 2015/0155930 A1 | 6/2015 | Liu et al. | | |
| 2015/0257024 A1 | 9/2015 | Baid et al. | | |
| 2016/0105820 A1* | 4/2016 | Hamalainen | .......... | H04W 48/18 370/235 |
| 2016/0269097 A1 | 9/2016 | Islam et al. | | |
| 2018/0338322 A1 | 11/2018 | Sun et al. | | |
| 2019/0230675 A1* | 7/2019 | Papa | ................... | H04L 12/4633 |
| 2020/0196196 A1* | 6/2020 | Syed | ................... | H04W 64/006 |

OTHER PUBLICATIONS

AT&T, "Forward Compatibility Design for NR Integrated Access and Backhaul", 3GPP TSG-RAN Working Group 2 Meeting #96, Reno, US, Nov. 14, 2016, pp. 1-4, R2-167632, 3GPP.

* cited by examiner

METHOD AND APPARATUS FOR TRAFFIC MANAGEMENT IN A SELF-BACKHAULED NETWORK BY USING CAPACITY REQUESTS

TECHNICAL FIELD

Embodiments presented herein relate to a base station and a method in a base station. In particular, embodiments relate to traffic management for integrated access and backhaul traffic.

BACKGROUND

Figure 1A:
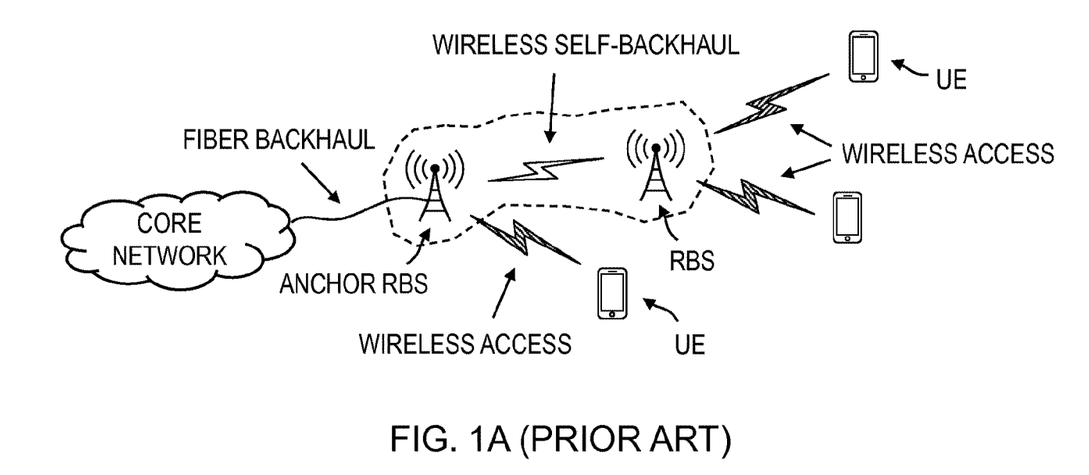
FIG. 1A shows schematically an example of a conventional single-hop self-backhauled wireless network.

FIG. 1A depicts a known implementation of a self-backhauled radio base station, RBS, with integrated access and backhaul traffic. The main principle behind self-backhauling is that the radio base station uses its own radio resources for backhaul traffic. Conventionally, a radio base station is equipped with a dedicated backhaul connection, e.g. a microwave radio link, a copper link or a fiber-optic link. However, with the introduction of larger numbers of small cells in future mobile networks, a more cost effective backhaul solution is to let some radio base station allocate part of its own radio resources to backhaul traffic.

In the self-backhauled network of FIG. 1A, the radio base station allocates a first part of its capacity to access traffic, i.e. communication between base station and user equipment, UE, and a second part of its capacity to provide a wireless self-backhaul connection to and from an anchor radio base station. The anchor base station is connected to the core network, e.g. by a fiber-optic link.

Integrated access and backhaul is specified within 3GPP for LTE relaying. Relaying can in this case be regarded as an access-integrated backhaul technology. In LTE, an in-band relayed eNB, i.e. a self-backhauled RBS, receives its wireless backhaul connection from a donor eNB. The donor eNB thus allocates parts of its radio resources to provide the relayed eNB with backhaul connectivity. The more backhaul capacity the relayed eNB needs, the more radio resources the donor eNB must allocate to backhaul traffic. In such a setup, the radio resources are shared between access and backhaul links which implies that access and backhaul links compete over the same radio resource pool.

Figure 1B:
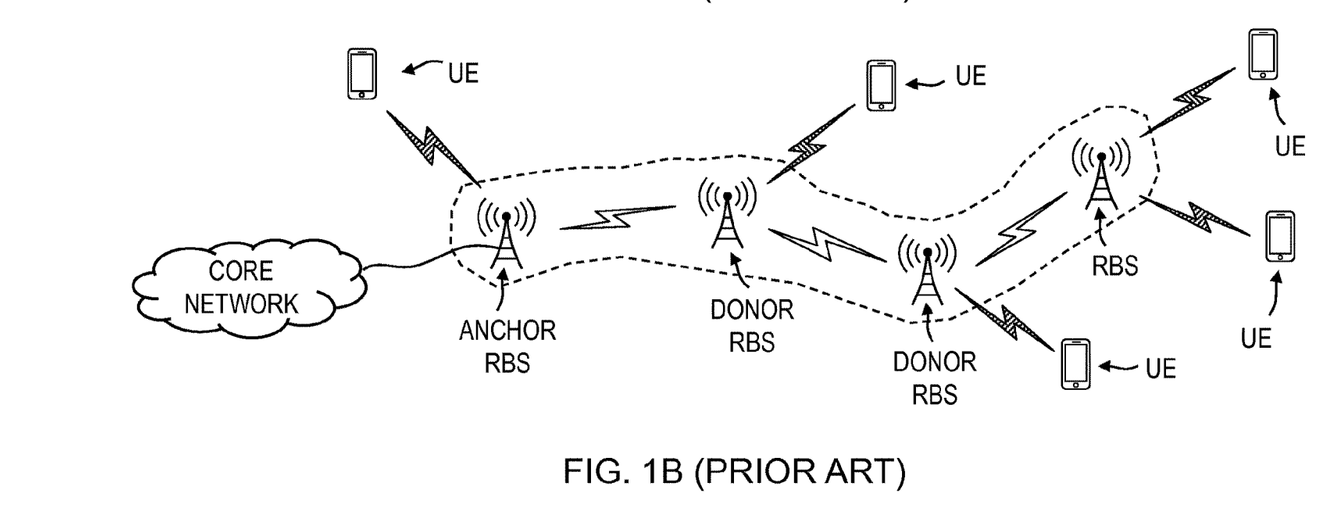
FIG. 1B shows schematically an example of a conventional multi-hop self-backhauled wireless network.

The self-backhauled network can also be a multi-hop link. FIG. 1B depicts an example of multi-hop deployment of a self-backhauled network of radio base stations. In a multi-hop deployment, the self-backhauled link from one radio base station is relayed along a certain route of donor radio base stations until it reaches its destination, an anchor RBS. The donor RBS donate a portion of its available wireless resources to forward the backhaul traffic of other radio base stations.

As mentioned above, a problem when deploying access-integrated backhaul networks is that access and backhaul links compete over the same radio resource pool. Hence, an increase in access traffic can lead to shortage of radio resources for backhaul links, especially in a multi-hop deployment where each radio base station of the backhaul chain adds further access traffic on top the incoming backhaul traffic. This can lead to poor backhaul connection, which in turn affects user experience and results in poor usage of radio resources.

The self-backhauled networks described above will easily be overloaded and not able to provide the backhaul capacity required for a consistent user experience. Currently there exist no efficient implementations that remedy this problem.

Hence, there is a need for an improved radio base station for integrated access and backhaul traffic that can reduce the problems of network overload and congestion in a self-backhauled network.

SUMMARY

It is an object of the present invention to remedy, or at least alleviate, some of these drawbacks and to provide an efficient radio base station and method for traffic management in a self-backhauled network. This is provided in a number of aspects of the present invention described below.

According to a first aspect, the invention describes a radio base station for integrated access and backhaul. The radio base station being configured to allocate a first part of its capacity to access traffic and a second part of its capacity to backhaul traffic. The radio base station being further configured to form a self-backhauled network with a plurality of other radio base stations, thus allowing each radio base station to be connected to the core network via the self-backhauled network. The radio base station is comprising a transmitter configured to transmit outgoing donor requests to adjacent radio base stations in the self-backhauled network, wherein each outgoing donor request is indicating a requested data rate for backhaul traffic to the respective adjacent radio base station. The radio base station is also comprising a receiver configured to receive incoming donor responses in response to the outgoing donor requests, wherein each incoming donor response is indicating a full grant, a partial grant or a rejection of the outgoing donor request from the respective adjacent radio base station. The radio base station is also comprising a routing unit configured to select a backhaul route based on the incoming donor responses. The transmitter is further configured to transmit the backhaul traffic to an adjacent radio base station in accordance with the selected backhaul route.

According to a second aspect, the invention describes a method in a radio base station, in which the radio base station is configured to allocate a first part of its capacity to access traffic and a second part of its capacity to backhaul traffic. The radio base station is further configured to form a self-backhauled network with a plurality of other radio base stations, thus allowing each radio base station to be connected to the core network via the self-backhauled network. The method comprising the step of transmitting outgoing donor requests to adjacent radio base stations in the self-backhauled network. Each outgoing donor request indicating a requested data rate for backhaul traffic to the respective adjacent radio base station. The method is also comprising the step of receiving incoming donor responses in response to the outgoing donor requests. Each incoming donor response indicating a full grant, a partial grant or a rejection of the outgoing donor request from the respective adjacent radio base station. The method is also comprising the step of selecting a backhaul route for the backhaul traffic of the radio base station based on the incoming backhaul grants. Lastly, the method is comprising the step of transmitting the backhaul traffic in accordance with the selected backhaul route.

The above radio base station and method can largely avoid network overload and congestion and provide efficient and dynamic traffic management for a self-backhauled network.

The drawings are not necessarily to scale and the dimensions of certain features may have been exaggerated for the sake of clarity, emphasis is instead being placed upon illustrating the principle of the embodiments herein.

DETAILED DESCRIPTION

This invention relates to signalling procedure for establishing a backhaul connection between a radio base stations, RBS, and its adjacent radio base stations in a self-backhauled network. The invention also relates to traffic management of said established connection. The invention may be used for both uplink and downlink backhaul traffic, and the invention is applicable to both fixed wireless access and mobile wireless access.

Four embodiments of the present invention are described in detail below with reference to FIGS. 2-8. A first and a second embodiment of the invention relate to a radio base station 230 and a third and fourth embodiment relate to a method in a base station. It should be noted that the scope of the present invention is not limited to the particular embodiments described herein, but only limited by the appended claims.

Figure 2:
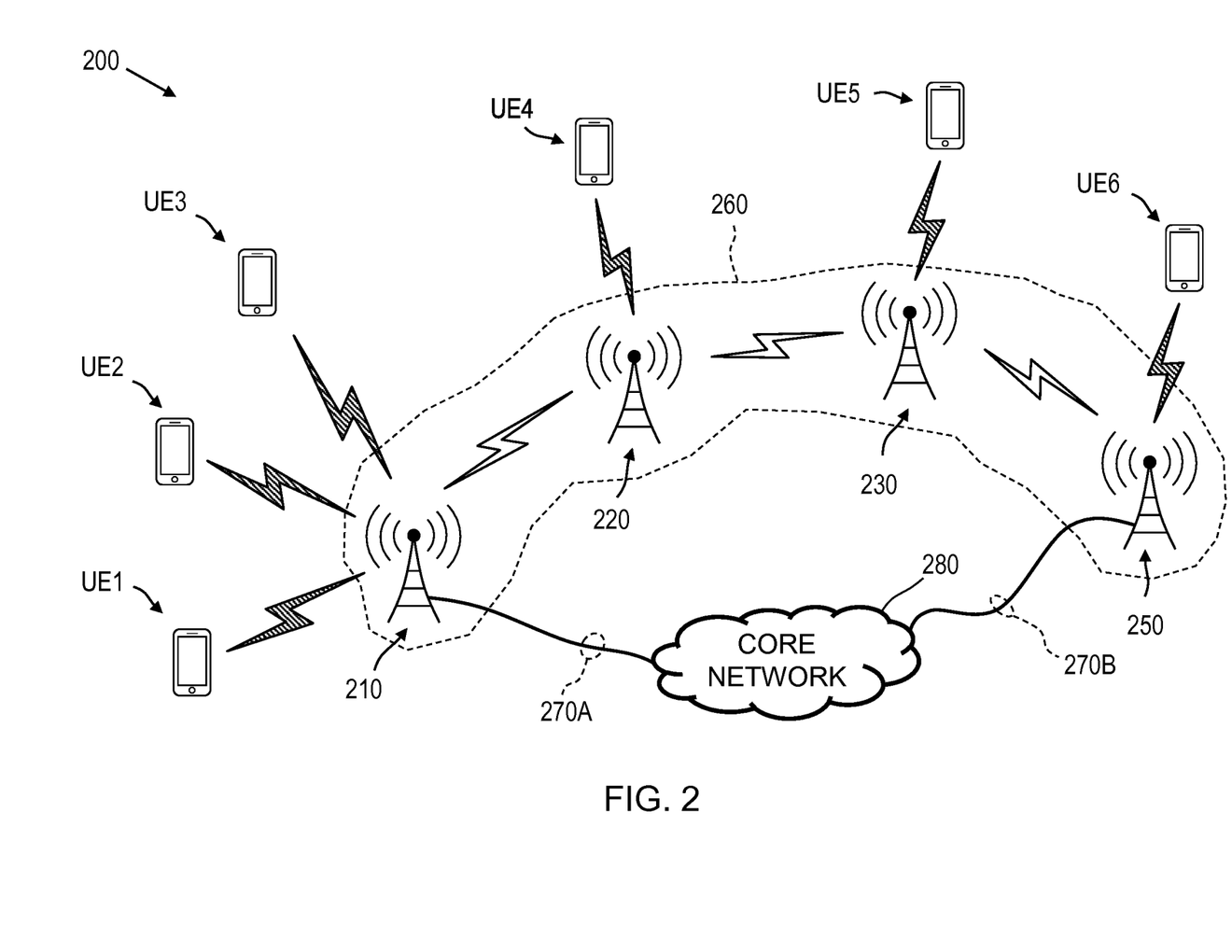
FIG. 2 shows schematically a first example of a multi-hop self-backhauled network according to the present invention.
Figure 3:
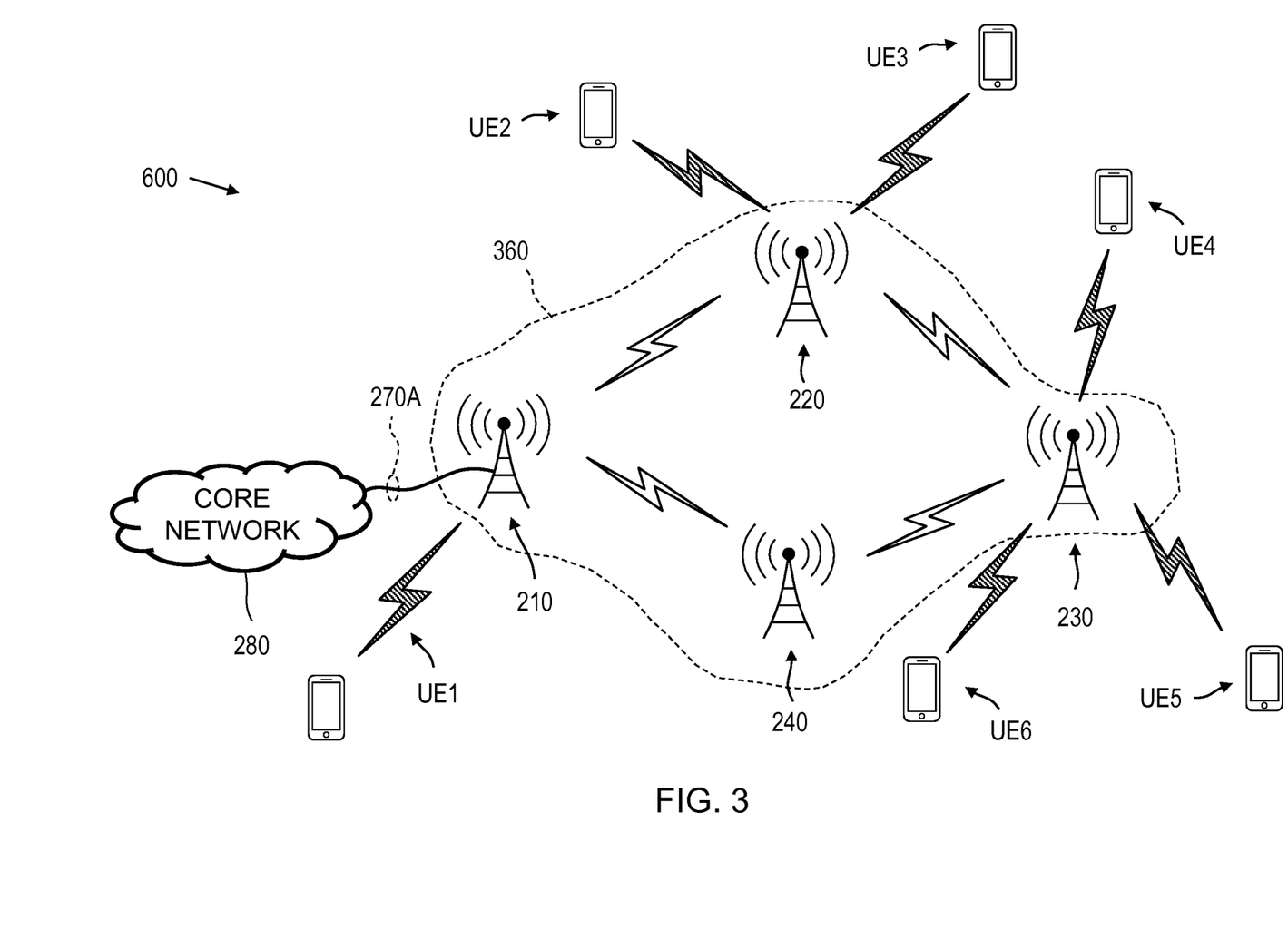
FIG. 3 shows schematically a second example of a multi-hop self-backhauled network according to the present invention.
Figure 4:
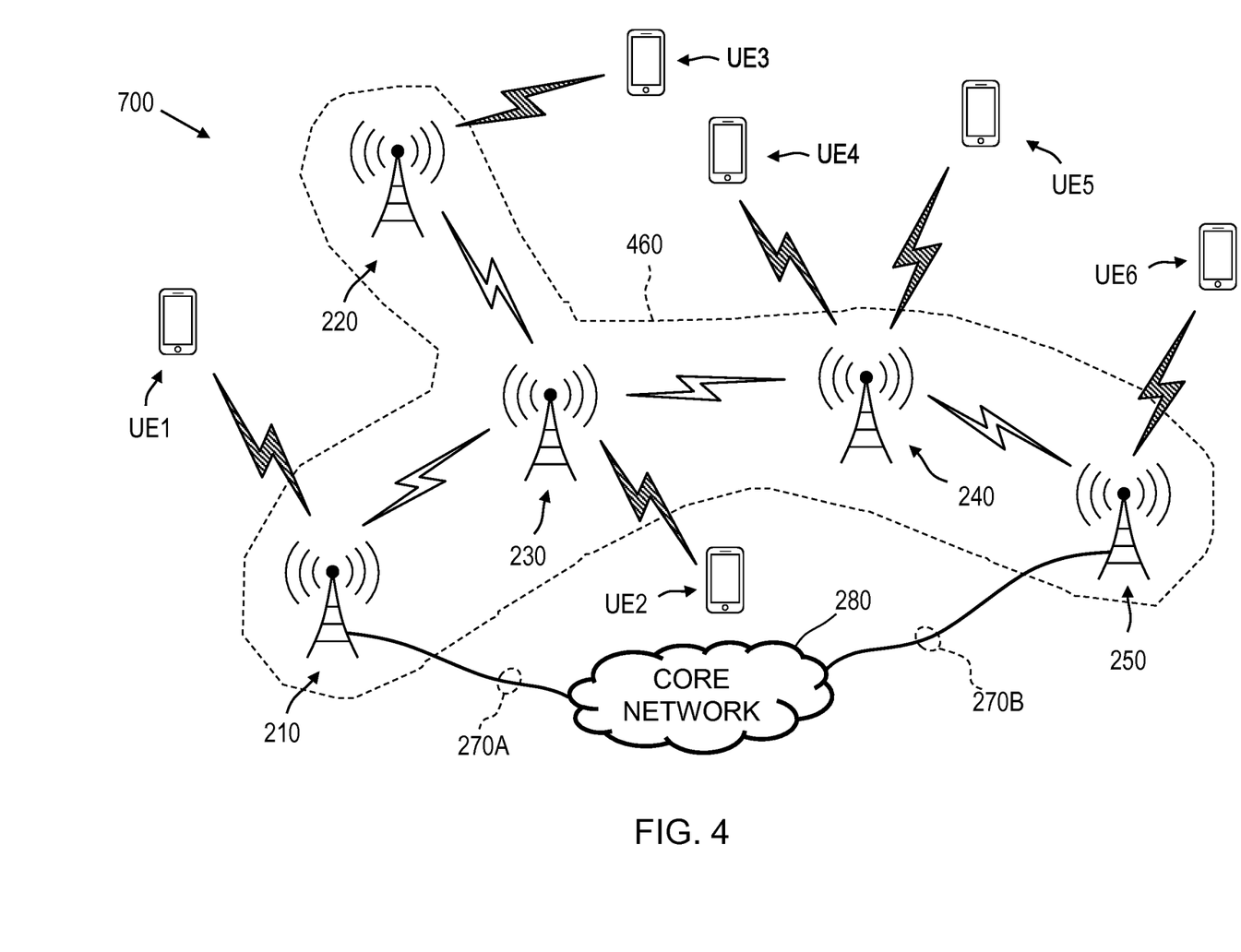
FIG. 4 shows schematically a third example of a multi-hop self-backhauled network according to the present invention.

FIGS. 2-4 show schematically three examples of multi-hop self-backhauled wireless networks. The three examples are comprising the radio base stations RBS 210, RBS 220, RBS 230, RBS 240 and RBS 250, with the user equipments UE1, UE2, UE3, UE4, UE5 and UE6 wirelessly connected to said radio base stations. The invention is described with respect to RBS 230, however, RBS 210, RBS 220, RBS 240 and RBS 250 may be implemented in the same way. A self-backhauled network 260, 360, 460 here refers to a network where the radio base stations use their own available radio resources, i.e. their available capacity, for backhaul traffic rather than a dedicated backhaul link, e.g. microwave, copper or fiber. The radio base stations in the self-backhauled network having their own dedicated backhaul links 270A, 270B are referred to as anchor radio base station 210, 250. All uplink and downlink backhaul traffic will have to pass through one of the anchor radio base stations, RBS 210 and RBS 250.

FIG. 2 depicts a multi-hop deployment 200 of a self-backhauled network 260. The network 260 comprises two anchor radio base stations, RBS 210 and RBS 250, that are connected directly to the core network 280 through dedicated backhaul links 270A, 270B. Hence, the other radio base stations, i.e. RBS 220 and RBS 230, will in this deployment always have two possible backhaul routes through the self-backhauled network 260 to choose from.

FIG. 3 depicts another multi-hop deployment 300 of a self-backhauled network 360. The self-backhauled network of FIG. 3 differs from that of FIG. 2 in that it only has one anchor RBS, RBS 210. However, the arrangement of the network 360 in a ring will ensure that the other radio base stations, i.e. RBS 220, RBS 230 and RBS 240, have two possible backhaul routes through the self-backhauled network 360 to choose from in this deployment.

FIG. 4 depicts yet another multi-hop deployment 400 of a self-backhauled network 460. The network 260 comprises two anchor radio base stations, RBS 210 and RBS 250. RBS 230 and 240 will in this deployment always have two possible backhaul routes. Backhaul traffic to and from RBS 220 will always have to be directed via RBS 230. Hence, RBS 220 should not be used as donor for uplink backhaul traffic.

The first and second embodiments relate to a radio base station 230 for integrated access and backhaul. The radio base station 230 is configured to allocate a first part of its capacity to access traffic and a second part of its capacity to backhaul traffic. The radio base station is further configured to form a self-backhauled network 260, 360, 460 with a plurality of other radio base stations 210, 220, 240, 250. The self-backhauled network may be arranged as a line, a ring, a mesh, a star, a tree or any combination thereof. At least one of the radio base stations of the self-backhauled network needs to be an anchor radio base station 210, 250. The anchor RBS 210, 250 is characterized by having a dedicated backhaul connection, e.g. microwave radio, copper or a fiber link, that is connected to the core network 280. Each radio base station in the self-backhauled network will thus be able to connect to the core network 280 via the self-backhauled network.

In the following, features of the first embodiment are described with reference to FIGS. 2-5, 7A and 7B. The first embodiment relates to the radio base station 230 configured to request backhaul capacity from adjacent donor radio base stations and further configured to select a backhaul route through the self-backhauled network.

Figure 5:
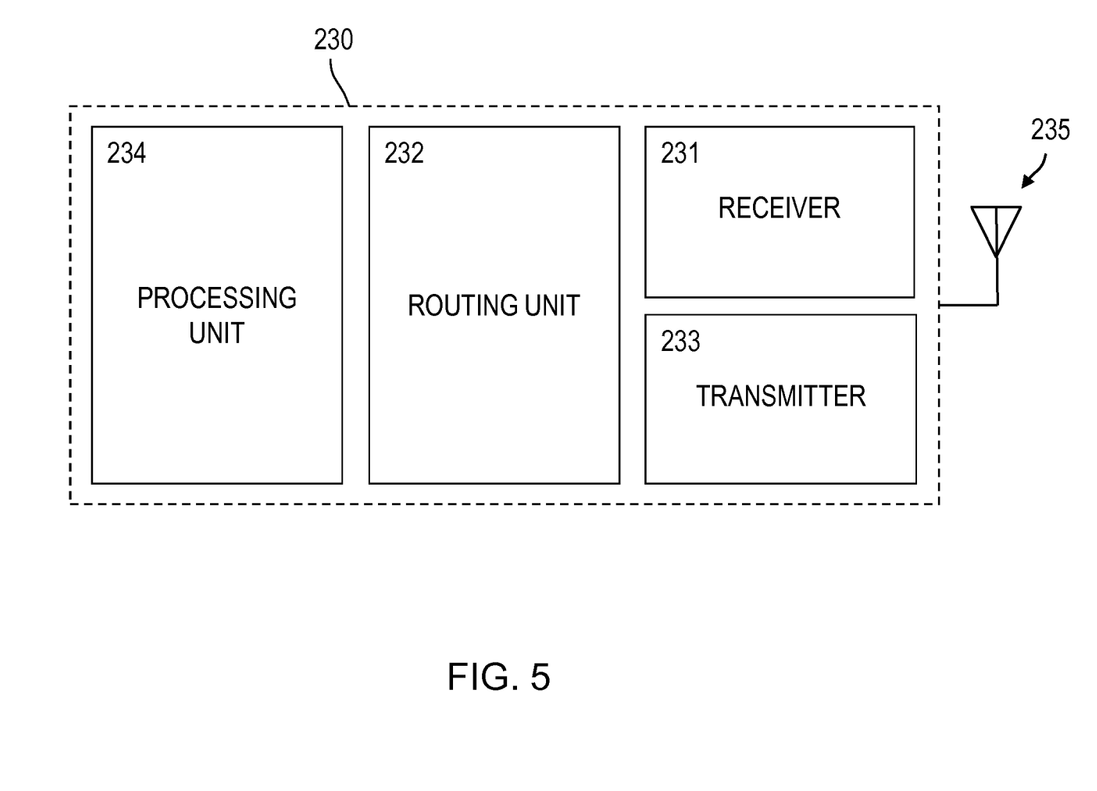
FIG. 5 shows schematically a radio base station configured for integrated access and backhaul traffic according to the present invention.

FIG. 5 depicts a radio base station in accordance with both the first and second embodiments. The radio base station 230 according to the first embodiment comprises a transmitter 233, a receiver 231, a routing unit 232.

The radio base station further comprises an antenna arrangement 235 connected to the receiver and the transmitter and configured to transmit and receive radio frequency signals. The antenna arrangement may be any type of antenna and with any number of antenna elements. A highly directive antenna, which may in particular be useful for fixed wireless access networks, will enable space-division which can increase the available radio resources for backhaul traffic significantly.

The transmitter 233 is configured to transmit outgoing donor requests 710A, 710B to adjacent radio base stations in the self-backhauled network 260. Each of the outgoing donor requests indicate a requested data rate for backhaul traffic to the respective adjacent radio base station. In one example, the requested data rate is a data rate sufficient for the access traffic of RBS 230. In another example, the requested data rate is a data rate sufficient for both the access traffic of RBS 230 and the backhaul traffic from other radio base stations that have requested to route their backhaul traffic via RBS 230. Note that the radio base station 230 may not be required to send an outgoing donor request 710A, 710B to all adjacent radio base stations. For example, in the uplink backhaul channel of FIG. 4, the radio base station 230 will send outgoing donor requests to the anchor RBS 210 and the donor RBS 240, but does not need to send any request to RBS 220 as it constitutes a dead end for uplink backhaul traffic.

The receiver 231 is configured to receive incoming donor responses 740A, 740B from adjacent radio base stations in response to the outgoing donor requests. Each incoming donor response will indicate a full grant, a partial grant or a rejection of the outgoing donor request from the respective adjacent radio base station. The grant and the partial grant of each donor response indicate the granted data rate for backhaul traffic from the radio base station 230 to a target radio base station 210, 220, 240, 250 in the self-backhauled network. A full grant is equal or greater than the requested data rate, a partial grant is less than the requested data rate but greater than zero, and a rejection is equal to a data rate of zero. The invention works for both uplink and downlink backhaul traffic. For uplink backhaul traffic, the target base station is an anchor radio base station, i.e. RBS 210 or RBS 250. For downlink backhaul traffic, the target base station is a radio base station without a dedicated backhaul link 270A, 270B to the core network 280, i.e. RBS 220 or RBS 240.

The routing unit 222, 232 is configured to select a backhaul route 750A, 750B based on the incoming donor responses 740A, 740B. Selecting backhaul route may here imply just selecting an adjacent radio base station, or alternatively, it may imply selecting a full route to the target base station. In one example, the routing unit may be configured to select the backhaul route 750A via any adjacent radio base station that provides a response indicating a full grant of the outgoing donor request. If several backhaul routes indicate full grant, the routing unit may be configured to select the backhaul route with the fewest number of hops to the target base station, or alternatively, be configured to select the backhaul route associated with the first incoming donor response 740A, 740B. In another example, the routing unit may be configured to select a first backhaul route 750A for a first portion of the backhaul traffic, and select a second backhaul route 750B, 760 for a second portion of the backhaul traffic.

After the backhaul route has been selected, the transmitter 233 is configured to transmit the backhaul traffic to an adjacent radio base station in accordance with the selected backhaul route.

Figure 7A:
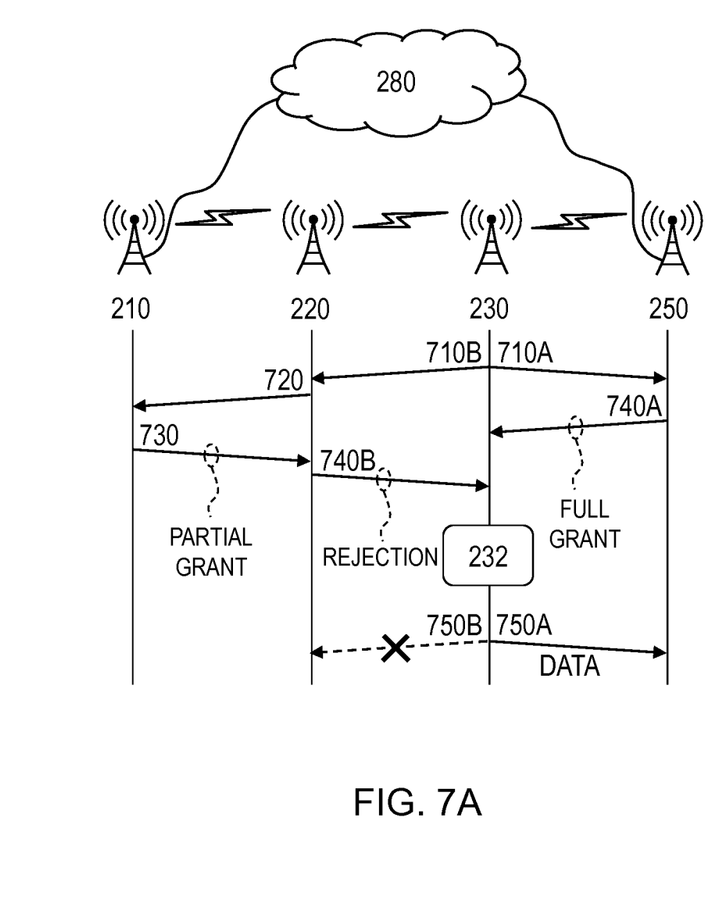
FIG. 7A shows schematically a first example of the signalling procedure of a radio base station for requesting a backhaul connection in the self-backhauled network.
Figure 7B:
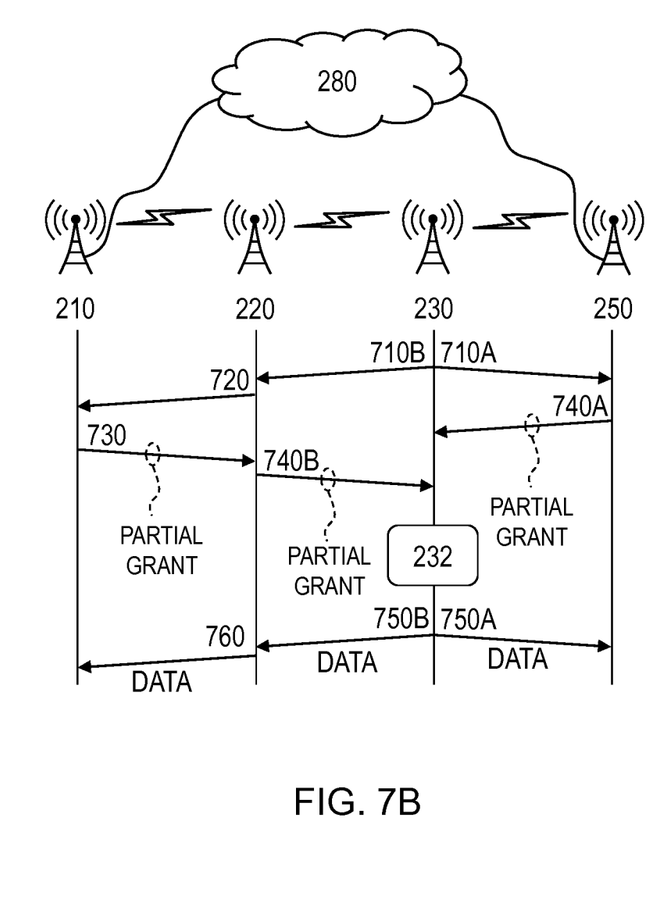
FIG. 7B shows schematically a second example of the signalling procedure of a radio base station for requesting a backhaul connection in the self-backhauled network.

FIGS. 7A and 7B illustrate two examples of the signalling procedure for establishing and transmitting backhaul traffic from the radio base station 230. The two examples are based on the network of FIG. 2 and relate to uplink backhaul traffic.

In the example of FIG. 7A, the radio base station 230 is configured to transmit outgoing donor requests 710A, 710B to the two adjacent radio base stations 220, 250 in the self-backhauled network 260. The first adjacent radio base station 250 is an anchor radio base station and can therefore respond 740A immediately after assessing its own available radio resources. In this example, the response from RBS 250 is a full grant, meaning that granted data rate is greater than or equal to the requested data rate. The second adjacent radio base station 220 cannot respond immediately unless it has already received a grant from anchor RBS 210 that covers both its own backhaul capacity needs and that of request 710B. Hence, RBS 220 sends an outgoing donor request 720 to the anchor RBS 210 requesting a data rate that covers both its own backhaul capacity needs and that of the incoming request 710B. RBS 210 is an anchor node and can thus respond 730 immediately after assessing its own available resources. In this example, the response from RBS 210 is a partial grant, meaning that granted data rate is less than the requested data rate but greater than zero. Since RBS 210 will not be able to facilitate the full backhaul capacity needs of RBS 220 and RBS 230, the response 740B will either be a partial grant or a rejection. In this example, the response 740B is a rejection. In RBS 230, the two incoming donor responses 740A, 740B are input to a routing unit. In this example, the routing unit selects the only available route 750A for its outgoing backhaul traffic.

In the example of FIG. 7B, the radio base station 230 is configured to transmit outgoing donor requests 710A, 710B to the two adjacent radio base stations 220, 250 in the self-backhauled network 260. The first adjacent radio base station 250 is an anchor radio base station and can therefore respond immediately after assessing its own available radio resources. In this example, the response 740A from the RBS 250 is a partial grant, meaning that granted data rate is less than the requested data rate but greater than zero. The second adjacent radio base station 220 cannot respond immediately unless it has already received a grant from anchor RBS 210 that covers both its own backhaul capacity needs and that of the request 710B. Hence, RBS 220 sends an outgoing donor request 720 to the anchor RBS 210 requesting a data rate that covers both its own backhaul capacity needs and that of the incoming request 710B. RBS 210 is an anchor node and can thus respond immediately after assessing its own available resources. In this example, the response 730 from RBS 210 is a partial grant. Since RBS 210 will not be able to facilitate the full backhaul capacity needs of RBS 220 and RBS 230, the response 740B will either be a partial grant or a rejection. In this example, the response 740B is a partial grant. In RBS 230, the two incoming donor responses 740A, 740B are input to a routing unit. None of the two routes 750A, 750B provides the required backhaul capacity. Hence, the routing unit selects a first backhaul route 750A for a first portion of the backhaul traffic, and a second backhaul route 750B for a second portion of the backhaul traffic.

In the following, features of the second embodiment are described with reference to FIGS. 2-5 and 8. The features of the first embodiment may also be comprised within the second embodiment. The second embodiment relates to the radio base station 230 configured as a donor RBS.

FIG. 5 depicts a radio base station in accordance with both the first and second embodiments. The radio base station 230 according to the second embodiment comprises a transmitter 233, a receiver 231 and a processing unit 234. The radio base station further comprises an antenna arrangement 235 connected to the receiver and the transmitter.

The receiver 231 is configured to receive an incoming donor request 810A from an adjacent radio base station. The incoming donor request 810A comprises a requested data rate. The incoming donor request may also comprise other network information, e.g. network topology, number of connected UEs and traffic prioritizing. For example, public safety or emergency traffic should be prioritized over other backhaul traffic. Also, time critical traffic, such as voice may have higher prioritizing than other backhaul traffic, e.g. file download.

The processing unit 234 is configured to determine an outgoing donor response 540A in response to the incoming donor request. The outgoing donor response indicate a full grant, a partial grant or a rejection of the incoming donor request. The grant and the partial grant of the outgoing donor response indicate the granted data rate for backhaul traffic from the radio base station 230 to a target radio base station 210, 220, 240, 250 in the self-backhauled network. A full grant is equal or greater than the requested data rate, a partial grant is less than the requested data rate but greater than zero, and a rejection is equal to a data rate of zero. One should note that for uplink backhaul traffic, the target base station is an anchor radio base station, i.e. RBS 210 or RBS 250, whereas for downlink backhaul traffic, the target base station is a radio base station without a dedicated backhaul link (270A, 270B) to the core network 280, i.e. RBS 220 or RBS 240. The second embodiment works for both uplink and downlink backhaul traffic.

The granted data rate may be determined based on one or more of the below items:

The access traffic of RBS 230. For example, the processing unit 234 determines the radio resources that RBS 230 needs for wireless access traffic and allocates the remaining radio resources to backhaul traffic.

The backhaul traffic of RBS 230. For example, uplink backhaul traffic that is passing RBS 230 and/or downlink backhaul traffic that is either passing RBS 230 or having RBS 230 as target RBS.

The incoming donor responses of RBS 230. For example, if RBS 230 receives a rejection from anchor RBS 250 of the multi-hop deployment of FIG. 2, it can no longer be donor to uplink backhaul traffic.

The incoming donor requests of RBS 230. For example, the processing unit 234 may reduce the radio resources allocated for wireless access traffic to RBS 230 in order to increase radio resources allocated to prioritized backhaul traffic. In another example, the processing unit 234 may reduce the radio resources allocated for wireless access traffic to RBS 230 in order to distribute backhaul capacity fairly among UEs connected to other radio base stations in the self-backhauled network 260, 360, 460.

The granted data rate may further be determined based on the position of the radio base station 230 in the self-backhauled network. For example, a leaf node in the self-backhauled network, e.g. RBS 220 of deployment 400, should never grant a donor request unless it is the target base station.

Lastly, the transmitter 233 is configured to transmit the outgoing donor response to the adjacent radio base station.

Figure 8:
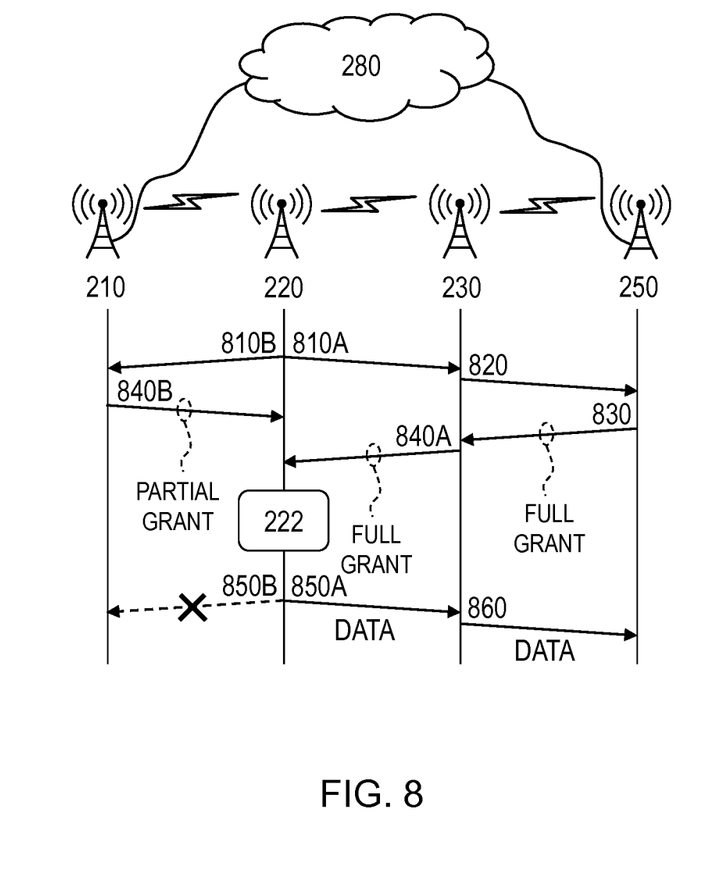
FIG. 8 shows schematically an example of the signalling procedure of a radio base station for receiving and responding to an incoming backhaul donor request in the self-backhauled network.

FIG. 8 illustrate an example of the signalling procedure of RBS 230 when configured as a donor RBS. The example is based on the network of FIG. 2 and relates to uplink backhaul traffic.

In the example of FIG. 8, the radio base station 220 in the self-backhauled network 260 is configured to transmit outgoing donor requests 810A, 810B to RBS 230 and RBS 210, respectively. RBS 210 is an anchor radio base station and can therefore respond 840B immediately after assessing its own available radio resources. In this example, the response from RBS 250 is a partial grant. RBS 230 cannot respond immediately unless it has already received a grant from anchor RBS 250 that covers both its own backhaul capacity needs and that of request 710B. Hence, RBS 230 sends an outgoing donor request 820 to the anchor RBS 210 requesting a data rate that covers both its own backhaul capacity needs and that of the incoming request 810A. RBS 250 is an anchor node and can thus respond 830 immediately after assessing its own available resources. In this example, the response from RBS 210 is a full grant. Hence, the response 840A will also a full grant. In RBS 220, the two incoming donor responses 740A, 740B are input to a routing unit 222. The routing unit 222 selects the backhaul route 750A associated with a full grant for its outgoing backhaul traffic.

The third and fourth embodiments relate to a method in a radio base station 230. The radio base station is configured to allocate a first part of its capacity to access traffic and a second part of its capacity to backhaul traffic. The radio base station is further configured to form a self-backhauled network 260, 360, 460 with a plurality of other radio base stations 210, 220, 240, 250. The self-backhauled network may be arranged as a line, a ring, a mesh, a star, a tree or any combination thereof. At least one of the radio base stations of the self-backhauled network needs to be an anchor radio base station 210, 250. The anchor RBS 210, 250 is characterized by having a dedicated backhaul connection, e.g. microwave radio, copper or a fiber link, that is connected to the core network 280. Thus, allowing each radio base station to be connected to the core network 280 via the other radio base stations in the self-backhauled network.

In the following, features of the third embodiment are described with reference to FIGS. 2-4, 6A and 7. The third embodiment relates to a method in the radio base station 230 configured to request backhaul capacity from an adjacent donor RBS.

Figure 6A:
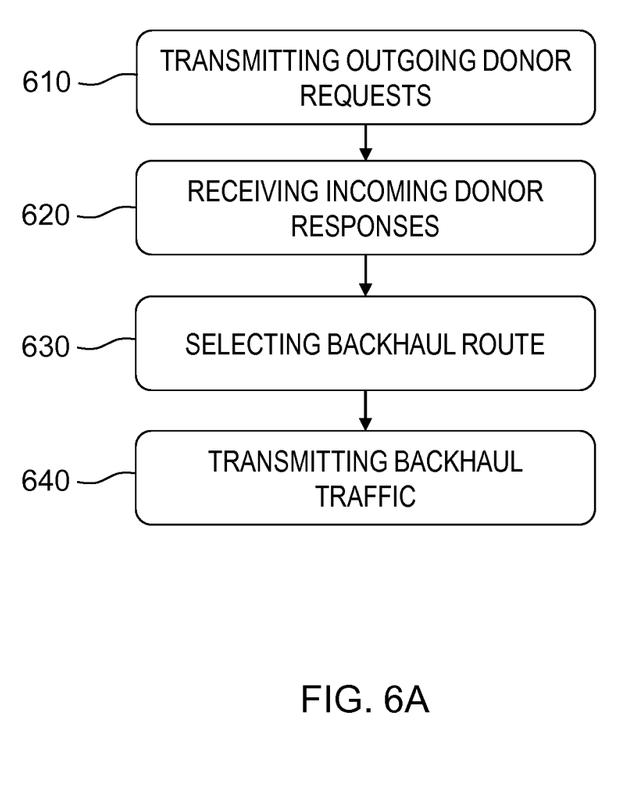
FIG. 6A shows schematically in a flowchart a method for requesting backhaul capacity, selecting a backhaul route and transmitting backhaul traffic in a self-backhauled network according to the present invention.

The method is comprising the step of transmitting 610 outgoing donor requests 410A, 410B to an adjacent radio base stations in the self-backhauled network 260. Each outgoing donor request indicating a requested data rate for backhaul traffic to the respective adjacent radio base station.

The method is further comprising the step of receiving 620 incoming donor responses 440A, 440B in response to the outgoing donor requests. Each incoming donor response indicating a full grant, a partial grant or a rejection of the outgoing donor request from the respective adjacent radio base station. The grant and the partial grant of each donor response indicate the granted data rate for backhaul traffic from the radio base station 230 to a target radio base station in the self-backhauled network. A full grant is equal or greater than the requested data rate, a partial grant is less than the requested data rate but greater than zero, and a rejection is equal to a data rate of zero. One should not that for uplink backhaul traffic the target base station is an anchor radio base station, i.e. RBS 210 or RBS 250. For downlink backhaul traffic target base station is a radio base station without a backhaul link 270A, 270B, i.e. RBS 220 or RBS 240.

The method is further comprising the step of selecting 630 a backhaul route for the backhaul traffic of the radio base station 230 based on the incoming backhaul grants 740A, 740B. The step of selecting may involve just selecting an adjacent radio base stations based on the incoming donor responses 740A, 740B. Alternatively, the step of selecting may involve selecting the full route to the target base station. In one example, the step of selecting 620 a backhaul route may comprise selecting a backhaul route 450A via an adjacent radio base station that provides a response indicating a full grant of the outgoing donor request. If several backhaul routes indicating full grant are available, the step of selecting may comprise selecting the backhaul route with the fewest number of hops to the target base station. Alternatively, the step of selecting may comprise selecting the backhaul route associated with the first incoming donor response 740A, 740B. In another example, the step of selecting 620 a backhaul route may comprise selecting a first backhaul route for a first portion of the backhaul traffic, and selecting a second backhaul route for a second portion of the backhaul traffic.

Lastly, the method is further comprising the step of transmitting 640 the backhaul traffic in accordance with the selected backhaul route.

In the following, features of the fourth embodiment are described with reference to FIGS. 2-4, 6B and 7. The features of the third embodiment may also be comprised within the fourth embodiment. The fourth embodiment relates to a method in the radio base station 230 when configured to operate as a donor RBS.

Figure 6B:
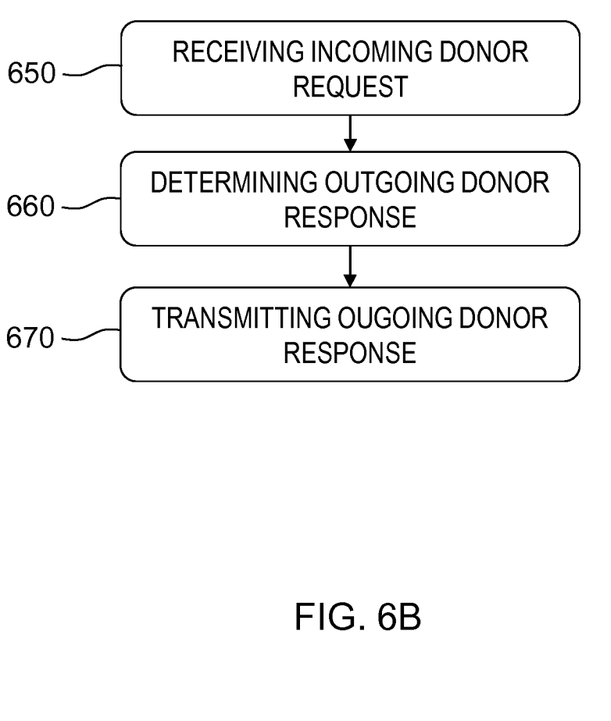
FIG. 6B shows schematically in a flowchart a method for determining and transmitting an outgoing capacity grant in a self-backhauled network according to the present invention.

The method is comprising the step of receiving 650 an incoming donor request 510A from an adjacent radio base station. The incoming donor request 810A comprises a requested data rate. The incoming donor request may also comprise other network information, e.g. network topology, number of connected UEs and traffic prioritizing. For example, public safety or emergency traffic should be prioritized over other backhaul traffic. Also, time critical traffic, such as voice may have higher prioritizing than other backhaul traffic, e.g. file download.

The method is further comprising the step of determining 660 an outgoing donor response 540A in response to the incoming donor request. The outgoing donor response indicates a full grant, a partial grant or a rejection of the outgoing donor request. The grant and the partial grant of the donor response may further indicate the granted data rate for backhaul traffic to a target radio base station in the self-backhauled network via the radio base station 230. For uplink backhaul traffic the target base station is an anchor radio base station, i.e. RBS 210 or RBS 250. For downlink backhaul traffic target base station is a radio base station without a backhaul link 270A, 270B, i.e. RBS 220 or RBS 240.

The step of determining may further comprise determining the granted data rate based on one or more of the below items:

The access traffic of RBS 230. For example, the step of determining may comprise determining the outgoing donor response as the remaining available radio resources after the radio resources for wireless access traffic to RBS 230 have been allocated.

The backhaul traffic of RBS 230. For example, uplink backhaul traffic that is transmitted via RBS 230 and/or downlink backhaul traffic that is either transmitted via RBS 230 or having RBS 230 as target RBS.

The incoming donor responses of RBS 230. For example, if RBS 230 receives a rejection from anchor RBS 250 in the deployment of FIG. 2, it can no longer be donor to uplink backhaul traffic.

The incoming donor requests of RBS 230. For example, the step of determining may further comprise reducing the radio resources allocated for wireless access traffic to RBS 230 in order to increase radio resources allocated to prioritized backhaul traffic. In another example, the step of determining may further comprise reducing the radio resources allocated for wireless access traffic to RBS 230 in order to distribute backhaul capacity fairly among UEs connected to the radio base stations of the self-backhauled network 260, 360, 460.

The step of determining may further comprise determining the granted data rate based on the position of the radio base station 230 in the self-backhauled network 260. For example, a leaf node in the self-backhauled network, e.g. RBS 220 of deployment 400, should never grant a donor request unless it is the target base station.

Lastly, the method is further comprising the step of transmitting 660 the outgoing donor response to the adjacent radio base stations in the self-backhauled network.

In the following, some alternative aspects of the four embodiments are described.

According to an aspect of the invention, a fixed minimum radio resource is allocated in a semi persistent manner for the backhaul links between the radio base stations.

According to another aspect of the invention, a third RBS gets a donor request from a first RBS. The third RBS also get a donor request from a second RBS. The first RBS removes its own need for backhaul and access and adds the donor requests from the second and third RBSs. The first RBS then distributes and forwards an outgoing donor request to other radio base stations having a backhaul connection to the third RBS.

According to another aspect of the invention, a second RBS receives a donor request from a first RBS. The second RBS calculates its own backhaul capacity requirements and adds the backhaul capacity requirements of the donor requests from the first RBS. The second RBS sends a first outgoing donor request to a third RBS and a second outgoing donor request to a fourth RBS. The combined first and second outgoing donor request being greater than or equal to the total backhaul capacity requirements of the second RBS.

According to yet another aspect of the invention, each donor request which is received in an RBS is forwarded individually to the RBS providing backhaul.

According to yet another aspect of the invention, an RBS can update the outgoing donor response based on change in its resource utilization.

According to yet another aspect of the invention, an RBS can update the outgoing donor request based on change in its resource utilization.

According to yet another aspect of the invention, the donor request received from other radio base stations is reduced with the amount of traffic corresponding to devices for which RBS has a direct access connection.

According to yet another aspect of the invention, each donor request may be associated with a prioritization indication.

Figure 9:
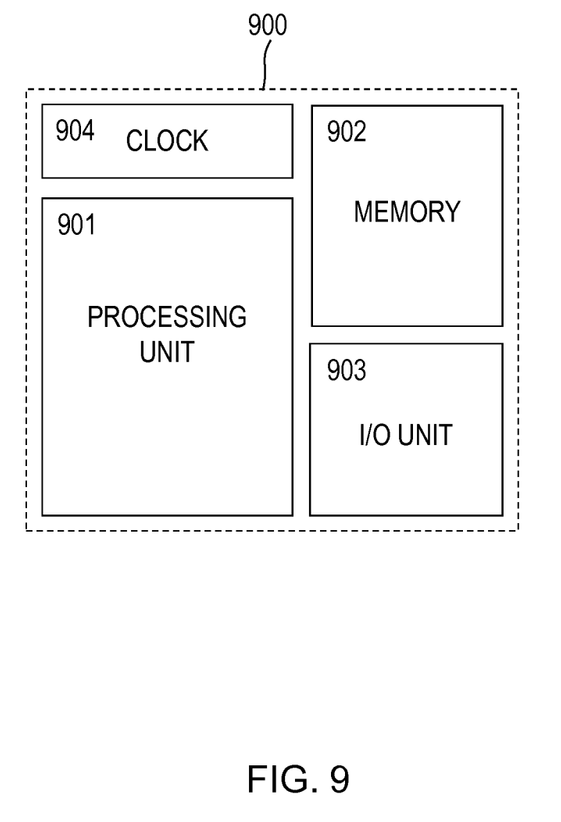
FIG. 9 shows schematically an example of a hardware implementation of the present invention.

According to yet another aspect of the invention, the radio base station 230 may be implemented as a processing unit 901, a memory 902, input/output unit 903 and a clock 904 as is illustrated in FIG. 9. The processing unit 901, the memory 902, the I/O unit 903 and the clock 904 may be interconnected. The processing unit 901 may comprise a central processing unit, a digital signal processor, a multi-processor system, programmable logic, a field programmable gate array (FPGA) or an application specific integrated circuit (ASIC) or any other type of logic. The memory 902 may comprise random access memory (RAM), read only memory (ROM) or any other type of volatile or non-volatile memory. The I/O unit 903 may comprise circuitry for controlling and performing signal conversions on I/O data and may further be connected to an antenna.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The invention claimed is:

1. A radio base station for integrated access and backhaul, the radio base station being configured to allocate a first part of its capacity to access traffic and a second part of its capacity to backhaul traffic, the radio base station being further configured to form a self-backhauled network with a plurality of other radio base stations thus allowing each radio base station to be connected to the core network via the self-backhauled network, radio base station comprising:
   a transmitter configured to transmit outgoing donor requests to adjacent radio base stations in the self-backhauled network, each outgoing donor request indicating a requested data rate for backhaul traffic to a respective adjacent radio base station;
   a receiver configured to:
      receive incoming donor responses in response to the outgoing donor requests, each incoming donor response indicating a full grant, a partial grant, or a rejection of the outgoing donor request from the respective adjacent radio base station; and
      receive an incoming donor request from an adjacent radio base station;
   a processing circuit configured to, in response to the incoming donor request, determine an outgoing donor response based on access traffic of the radio base station and a position of the radio base station in the self-backhauled network, the outgoing donor response indicating a full grant, a partial grant, or a rejection of the incoming donor request;
   a routing circuit configured to select a backhaul route based on the incoming donor responses; and
   wherein the transmitter is further configured to:
      transmit the backhaul traffic to an adjacent radio base station in accordance with the selected backhaul route; and
      transmit the outgoing donor response to the adjacent radio base station.

2. The radio base station of claim 1, wherein the grant and the partial grant of each incoming donor response indicate the granted data rate for backhaul traffic to a target radio base station in the self-backhauled network.

3. The radio base station of claim 1, wherein the routing circuit is configured to select the backhaul route via an adjacent radio base station that provides a response indicating a full grant of the outgoing donor request.

4. The radio base station of claim 1, wherein the routing circuit is configured to select a first backhaul route for a first portion of the backhaul traffic, and select a second backhaul route for a second portion of the backhaul traffic.

5. The radio base station of claim 1, wherein the grant and the partial grant of the outgoing donor response indicate the granted data rate for backhaul traffic to a target radio base station in the self-backhauled network.

6. The radio base station of claim 1, wherein the outgoing donor response is further determined based on the incoming donor responses of the radio base station.

7. The radio base station of claim 1, wherein the backhaul traffic is uplink backhaul traffic and the target base station is an anchor radio base station.

8. The radio base station of claim 1, wherein the backhaul traffic is downlink backhaul traffic and the target base station is a radio base station without a backhaul link.

9. A method in a radio base station, the radio base station being configured to allocate a first part of its capacity to access traffic and a second part of its capacity to backhaul traffic, the radio base station being further configured to form a self-backhauled network with a plurality of other radio base stations thus allowing each radio base station to be connected to the core network via the self-backhauled network, the method comprising the radio base station:
   transmitting outgoing donor requests to adjacent radio base stations in the self-backhauled network, each outgoing donor request indicating a requested data rate for backhaul traffic to a respective adjacent radio base station;
   receiving incoming donor responses in response to the outgoing donor requests; each incoming donor response indicating a full grant, a partial grant, or a rejection of the outgoing donor request from the respective adjacent radio base station;
   selecting a backhaul route for the backhaul traffic of the radio base station based on the incoming backhaul grants;
   transmitting the backhaul traffic in accordance with the selected backhaul route;
   receiving an incoming donor request from an adjacent radio base station;
   determining, in response to the incoming donor request, an outgoing donor response based on access traffic of the radio base station and a position of the radio base station in the self-backhauled network, the outgoing donor response indicating a full grant, a partial grant, or a rejection of the incoming donor request; and
   transmitting the outgoing donor response to the adjacent radio base stations in the self-backhauled network.

10. The method of claim 9, wherein the grant and the partial grant of each incoming donor response indicate the granted data rate for backhaul traffic from the radio base station to a target radio base station in the self-backhauled network.

11. The method of claim 9, wherein the selecting the backhaul route comprises selecting a backhaul route via an adjacent radio base station that provides a response indicating a full grant of the outgoing donor request.

12. The method of claim 9, wherein the selecting the backhaul route comprises selecting a first backhaul route for a first portion of the backhaul traffic, and selecting a second backhaul route for a second portion of the backhaul traffic.

13. The method of claim 9, wherein the grant and the partial grant of the outgoing donor response indicate the granted data rate for backhaul traffic to a target radio base station in the self-backhauled network via the radio base station.

14. The method of claim 9, wherein the backhaul traffic is uplink backhaul traffic and the target base station is an anchor radio base station.

15. The method of claim 9, wherein the backhaul traffic is downlink backhaul traffic and the target base station is a radio base station without a backhaul link.

* * * * *